March 28, 1950 M. P. GLOWACKI 2,502,375
FILTER DEVICE
Filed Dec. 6, 1946
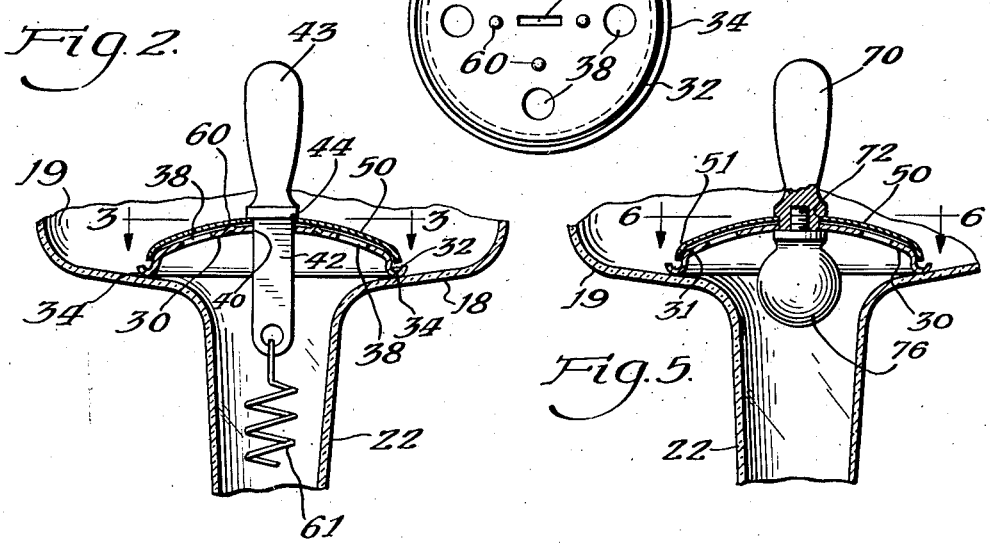
Inventor:
Matthew P. Glowacki
By: Walter L. Schlegel, Jr.
Attorney Patented Mar. 28, 1950

2,502,375

UNITED STATES PATENT OFFICE 2,502,375

FILTER DEVICE

Matthew P. Glowacki, Chicago, Ill.

Application December 6, 1946, Serial No. 714,589

3 Claims. (Cl. 210—162)

This invention relates generally to an apparatus for making infusions of coffee and the like, and more particularly to a filtering device utilized in a coffee brewing utensil of the vacuum type.

In coffee makers of the vacuum type there is generally provided a lower container or bowl in the form of a decanter, and an upper container in the nature of a funnel comprising a tubular stem depending into the decanter and having a sealed connection therewith. Such a device conventionally utilizes a filtering unit positioned in the upper container at a point where the container narrows to form the tubular stem.

It is an object of the present invention to devise a filtering device which is simple, inexpensive to produce, and adapted to meet the operating requirements of a vacuum type brewer.

More particularly the filtering device is adapted for use in coffee brewers which differ somewhat in size and contour, as is commonly encountered in commercial practice. The filtering device herein described is adapted to rest upon the circular line seat at the point near the base of the upper bowl.

These and other objects of my invention will be described in connection with the accompanying drawings, wherein:

Fig. 1 is a vertical cross-sectional view partly in elevation through a vacuum type coffee brewer, incorporating the novel filtering unit;

Fig. 2 is an enlarged fragmentary vertical cross-section of the brewer shown in Fig. 1;

Fig. 3 is a sectional view taken on the line 3—3 of Fig. 2;

Fig. 4 is a plan view of the bottom disk of the filter;

Fig. 5 is a view comparable to Fig. 2 but showing a modification of the invention; and Fig. 6 is a sectional view taken on the line 6—6 of Fig. 5.

Describing the invention in detail and referring first to the embodiment illustrated in Figs. 1–4, the coffee brewer, which is of the vacuum type, comprises a lower bowl or container 10 in the form of a decanter adapted to rest upon or over a heater (not shown). This container 10 is provided in its upper region with a constricted neck 12 which terminates in an outwardly flaring mouth 14. Positioned in the mouth 14 is an annular resilient gasket 16 whereon is rested the base portion 18 of the upper bowl container 19 which is curved downwardly and inwardly to join the base portion 18 along a circular indentation line which defines a constricted portion of the upper funnel bowl 19. The constricted portion 18 of the upper bowl 19 extends downwardly to form the tube or hollow stem 22, which depends from the base of the upper bowl 19 and extends through the neck 12 of the lower decanter 10 downwardly to a point relatively close to the bottom thereof.

The novel filtering unit shown in detail in Fig. 2 comprises a dished lower plate or disk 30 in the form of a shell having an annular flanged depending lip 32 reflanged as at 34 to afford a line seat against the base 18.

The lower disk 30 is provided with a plurality of openings 38. These openings 38 are preferably positioned in quadrants shown in Fig. 4 and are approximately a quarter inch in diameter, the base diameter of the disk 30 being approximately two inches. The disk 30 is also provided with a central slot 40 forming a passageway for a non-round shank member 42, which is afforded a snug sliding fit therein. The shank member 42 is formed with a handle 43 and a flanged portion 44 affording a bearing surface engaging a dished upper disk or plate 50, which bears upon the lower disk 30. The upper disk 50 comprises an opening 52 slidably receiving the member 42. A plurality of openings 54 are stamped in the upper disk 50 in juxtaposition and are preferably positioned approximately 45 degrees out of alignment with the corresponding openings 38 of the lower disk 30. Projections 60 are formed on the arcuate convex surface of the lower disk 30 and extend in an upward direction so as to afford a bearing against the lower concave face of the upper disk 50, thereby affording a flow passage or space between said disks 30 and 50.

At the lower portion of the shank member 42 is attached a tension spring 61 which limits downward movement of the plates 30 and 50 when the device is removed for cleaning and which is connected to a hook 62 adapted to engage the lower end of the stem 22.

It may be noted that the shank 42 is operable to maintain the opening 38 and 54 in misalignment so that the coffee particles are trapped in the shallow flow passage between the disks at the margins of the openings 54, said passage being preferably of a depth not substantially greater than about 0.008 inch so as to trap substantially all coffee particles as the coffee liquor flows between the disks at the perimeters thereof and also through the openings 38 and 54. If desired, the projections 60 may be eliminated, and the abutting disk surfaces will prevent closure of the shallow flow passages therebetween, thereby accommodating flow of the coffee through the openings 38 and 54.

Such a construction is shown in Fig. 5, wherein the projections 60 are eliminated, and the abutting disk surfaces at 31, are afforded by a depending annular flange of the upper disk 50 and the outer perimeter of the lower disk 30 adjacent the flanged lower extremity thereof. Figs. 5 and 6 show a further modification in the construction of the filtering unit wherein a cylindrical upper knob or handle 70 is provided with a rectangular shank inserted in complementary rectangular openings 72 in the upper disk 50 and the lower disk 30. A lower knob 76 is attached to the shank of the knob 70, as by a threaded connection so as to clamp the upper disk 50 and the lower disk 30 together. The knob assembly as described is made of heavy metal, such as brass or stainless steel so as to afford means of holding the lower disk 30 in close proximity with the inner surface of the upper bowl 19 by the force of gravity. This modification eliminates the spring 61 utilized in the embodiment of Figs. 1–4.

It will be understood that the above described embodiments of the invention are merely by way of illustration, inasmuch as various modifications will be readily apparent to those skilled in the art without departing from the spirit of the invention and the scope of the appended claims.

I claim:

1. A filter device for a vacuum coffee maker having a flow passage terminating in a mouth, comprising a filter unit including a plurality of plates with misaligned openings therethrough, means for spacing said plates to define flow passages therebetween communicating with said openings, the plate at one end of said unit being adapted to seat against the mouth of said passage, means for maintaining said openings in misalignment comprising a nonround shank slidably fitted in complementary openings through said plates to prevent relative rotation therebetween while accommodating relative movement therebetween longitudinally of the shank during cleaning of said plates, said shank having an abutment adapted to bear against the plate at the other end of said unit along a surface of the last-mentioned plate remote from said mouth to limit relative movement between the shank and plates in one direction longitudinally of the shank, tension spring means connected to a portion of said shank longitudinally beyond the first-mentioned end of the unit and adapted to be disposed in said passage, and means for connecting said spring means under tension to a portion of said vessel, thereby urging the unit against the mouth of said passage, said spring means having means for limiting relative movement between the shank and plates in the opposite direction longitudinally of the shank.

2. A filter device for a vacuum coffee-maker comprising a plurality of plates having misaligned openings therethrough, means for spacing said plates to define flow passages therebetween communicating with said openings, means for maintaining said openings in misalignment comprising a nonround shank slidably fitted through complementary openings through said plates to prevent relative rotation therebetween and afford relative movement therebetween longitudinally of the shank thereby facilitating cleaning of the plates, an abutment on said shank engaging one of the plates to limit relative movement between the plates and shank in one direction longitudinally of the shank, tension spring means connected to a portion of the shank at one side of the plates and adapted to be disposed within an associated flow passage, means for connecting said spring means under tension to an associated interlocking element, a handle on said shank at the opposite side of the plates, and means for limiting relative movement between the plates and shank in the opposite direction longitudinally of the shank.

3. A filter device for a vacuum coffee-maker comprising a pair of plates having misaligned openings therethrough, means for maintaining said openings in misalignment comprising a shank having a nonround portion slidably fitted through complementary nonround openings of the plates to prevent relative rotation therebetween and to afford relative movement therebetween axially of the shank during cleaning of the plates, means around said shank portion for spacing said plates to define a flow passage therebetween, an abutment on the shank engageable with one of the plates to limit relative movement thereof in one direction axially of the shank, means for limiting relative movement of the plates and shank in the other direction axially of the shank, torsion spring means for connecting the shank to the end of an associated flow passage for urging said plate against said abutment and for urging the other plate against a mouth of said passage, and a handle on said shank at the end thereof remote from said spring means.

MATTHEW P. GLOWACKI.

REFERENCES CITED

The following references are of record in the file of this patent:

UNITED STATES PATENTS

| Number | Name | Date |
| --- | --- | --- |
| 413,748 | Bowman | Oct. 29, 1889 |
| 2,234,678 | Matson | Mar. 11, 1941 |
| 2,240,721 | Selitzky | May 6, 1941 |
| 2,269,956 | Renner | Jan. 13, 1942 |
| 2,390,269 | Peterson | Dec. 4, 1945 |

FOREIGN PATENTS

| Number | Country | Date |
| --- | --- | --- |
| 462,233 | France | of 1913 |